United States Patent
Karavitis

(10) Patent No.: US 8,908,739 B2
(45) Date of Patent: Dec. 9, 2014

(54) TRANSVERSE ADJUSTABLE LASER BEAM RESTRICTOR

(75) Inventor: Michael Karavitis, Dana Point, CA (US)

(73) Assignee: Alcon LenSx, Inc., Aliso Viejo, CA (US)

( * ) Notice: Subject to any disclaimer, the term of this patent is extended or adjusted under 35 U.S.C. 154(b) by 162 days.

(21) Appl. No.: 13/336,659

(22) Filed: Dec. 23, 2011

(65) Prior Publication Data

US 2013/0163622 A1 Jun. 27, 2013

(51) Int. Cl.
*H01S 3/08* (2006.01)
*H01S 3/00* (2006.01)
*H01S 3/10* (2006.01)

(52) U.S. Cl.
CPC ........... *H01S 3/0057* (2013.01); *H01S 3/10015* (2013.01)
USPC .......................................... 372/103; 372/107

(58) Field of Classification Search
CPC ... H01S 3/0057; H01S 3/0065; H01S 3/2308; H01S 3/10015
USPC ................................................ 372/103, 107
See application file for complete search history.

(56) References Cited

U.S. PATENT DOCUMENTS

| | | | |
|---|---|---|---|
| 3,573,656 A * | 4/1971 | Marcatili | 372/19 |
| 4,896,119 A | 1/1990 | Williamson et al. | |
| 5,221,988 A | 6/1993 | Juhasz | |
| 5,329,398 A | 7/1994 | Lai et al. | |
| 5,499,134 A * | 3/1996 | Galvanauskas et al. | 359/333 |
| 5,541,951 A | 7/1996 | Juhasz et al. | |
| 5,548,234 A | 8/1996 | Turi et al. | |
| 5,561,678 A | 10/1996 | Juhasz et al. | |
| 5,594,256 A | 1/1997 | Siebert | |
| 5,656,186 A | 8/1997 | Mourou et al. | |
| 5,701,319 A | 12/1997 | Fermann | |
| 5,730,811 A | 3/1998 | Azad et al. | |
| 5,734,503 A | 3/1998 | Szipocs et al. | |
| 5,847,863 A | 12/1998 | Galvanauskas et al. | |
| 5,867,304 A | 2/1999 | Galvanauskas et al. | |
| 6,081,543 A * | 6/2000 | Liu et al. | 372/102 |
| 6,174,648 B1 | 1/2001 | Terao et al. | |
| 6,198,568 B1 | 3/2001 | Galvanauskas et al. | |

(Continued)

FOREIGN PATENT DOCUMENTS

| | | |
|---|---|---|
| DE | 100 63 976 | 7/2002 |
| JP | 2005 164973 | 6/2005 |
| JP | 2005 175245 | 6/2005 |
| WO | 2009098459 A1 | 8/2009 |

OTHER PUBLICATIONS

Galvanauskas et al.; "Use of Volume Chirped Bragg Gratings for Compact High-Energy Chirped Pulse Amplification Circuits"; CLEO; p. 362 (1998).

(Continued)

*Primary Examiner* — Julio J Maldonado
*Assistant Examiner* — Joshua King

(57) ABSTRACT

A laser adjustment system can include an adjustable seed-beam restrictor, configured to be attachable to a stretcher-compressor in a transverse-adjustable manner, and to restrict an incidence of a seed beam, generated by an oscillator, on the stretcher-compressor, wherein the stretcher-compressor is configured to be integrated into a chirped pulse amplification laser engine, and to stretch a duration of seed pulses of the seed beam.

13 Claims, 11 Drawing Sheets

(56) References Cited

U.S. PATENT DOCUMENTS

| | | | |
|---|---|---|---|
| 6,208,458 | B1 | 3/2001 | Galvanauskas et al. |
| 6,324,191 | B1 | 11/2001 | Horvath |
| 6,393,035 | B1 | 5/2002 | Weingarten et al. |
| 6,580,732 | B1 | 6/2003 | Guch, Jr. et al. |
| 6,693,927 | B1 | 2/2004 | Horvath et al. |
| 6,726,679 | B1 | 4/2004 | Dick et al. |
| 6,785,303 | B1 | 8/2004 | Holzwarth et al. |
| 6,785,319 | B1 * | 8/2004 | Ariga et al. ............... 372/99 |
| 6,807,198 | B1 | 10/2004 | Furbach et al. |
| 7,103,077 | B2 | 9/2006 | Schuhmacher et al. |
| 7,116,688 | B2 | 10/2006 | Sauter et al. |
| 7,131,968 | B2 | 11/2006 | Bendett et al. |
| 7,386,211 | B1 | 6/2008 | Di Teodoro et al. |
| 7,444,049 | B1 * | 10/2008 | Kim et al. ............... 385/37 |
| 7,522,642 | B2 | 4/2009 | Zadoyan et al. |
| 7,643,521 | B2 | 1/2010 | Loesel |
| 7,756,170 | B2 * | 7/2010 | Almoric et al. .......... 372/29.014 |
| 7,822,347 | B1 * | 10/2010 | Brennan et al. ............... 398/193 |
| 8,189,971 | B1 * | 5/2012 | Vaissie et al. ............... 385/37 |
| 2003/0189756 | A1 | 10/2003 | Erbert et al. |
| 2003/0193975 | A1 | 10/2003 | Pang |
| 2004/0083814 | A1 | 5/2004 | Lehmann et al. |
| 2004/0243111 | A1 | 12/2004 | Bendett et al. |
| 2005/0041702 | A1 | 2/2005 | Fermann et al. |
| 2005/0079645 | A1 | 4/2005 | Moriwaka |
| 2005/0111500 | A1 | 5/2005 | Harter et al. |
| 2005/0157382 | A1 | 7/2005 | Kafka et al. |
| 2006/0221449 | A1 | 10/2006 | Glebov et al. |
| 2007/0013995 | A1 | 1/2007 | Kaertner et al. |
| 2007/0041083 | A1 | 2/2007 | Di Teodoro et al. |
| 2007/0091977 | A1 | 4/2007 | Sohn et al. |
| 2007/0098025 | A1 | 5/2007 | Hong et al. |
| 2008/0130099 | A1 * | 6/2008 | Harter ............... 359/341.1 |
| 2009/0086773 | A1 | 4/2009 | Murison et al. |
| 2009/0257464 | A1 | 10/2009 | Dantus et al. |
| 2011/0038390 | A1 | 2/2011 | Rudd et al. |
| 2011/0063597 | A1 | 3/2011 | Mengel |
| 2011/0206071 | A1 | 8/2011 | Karavitis |

OTHER PUBLICATIONS

PCT/US2011/026061 International Search Report and Written Opinion, mailed Nov. 14, 2011, 10 pages.

PCT/US2011/026055 International Search Report and Written Opinion; mailed Jan. 2, 2012, 9 pages.

PCT/US2011/026037 International Search Report and Written Opinion; mailed Oct. 26, 2011.

PCT/US2011/026031 International Search Report and Written Opinion; mailed Oct. 31, 2011, 9 pages.

Efimov, A., et al., "Programmable phase compensation I a multipass TI:sapphire CPA system", Lasers and Electro-Optics, 1998, CLEO 98, Technical Digest, Summaries of papers presented at the conference on, IEEE, Washington, DC, USA, May 3, 1998, pp. 165-166.

Efimov, A., et al., "Minimization of dispersion in an ultrafast chirped pulse amplifier using adaptive learning", Applied Physics B: Lasers and Optics, vol. 70, No. S1, Jun. 1, 2000, pp. S133-S141.

European Patent Office Patent Abstract of Japan Publication No. 2005164973.

European Patent Office Patent Abstract of Japan Publication No. 2005175245.

PCT International Search Report dated Mar. 25, 2012 for International Application No. PCT/US2012/070478 filed Dec. 19, 2012, 5 pages.

* cited by examiner

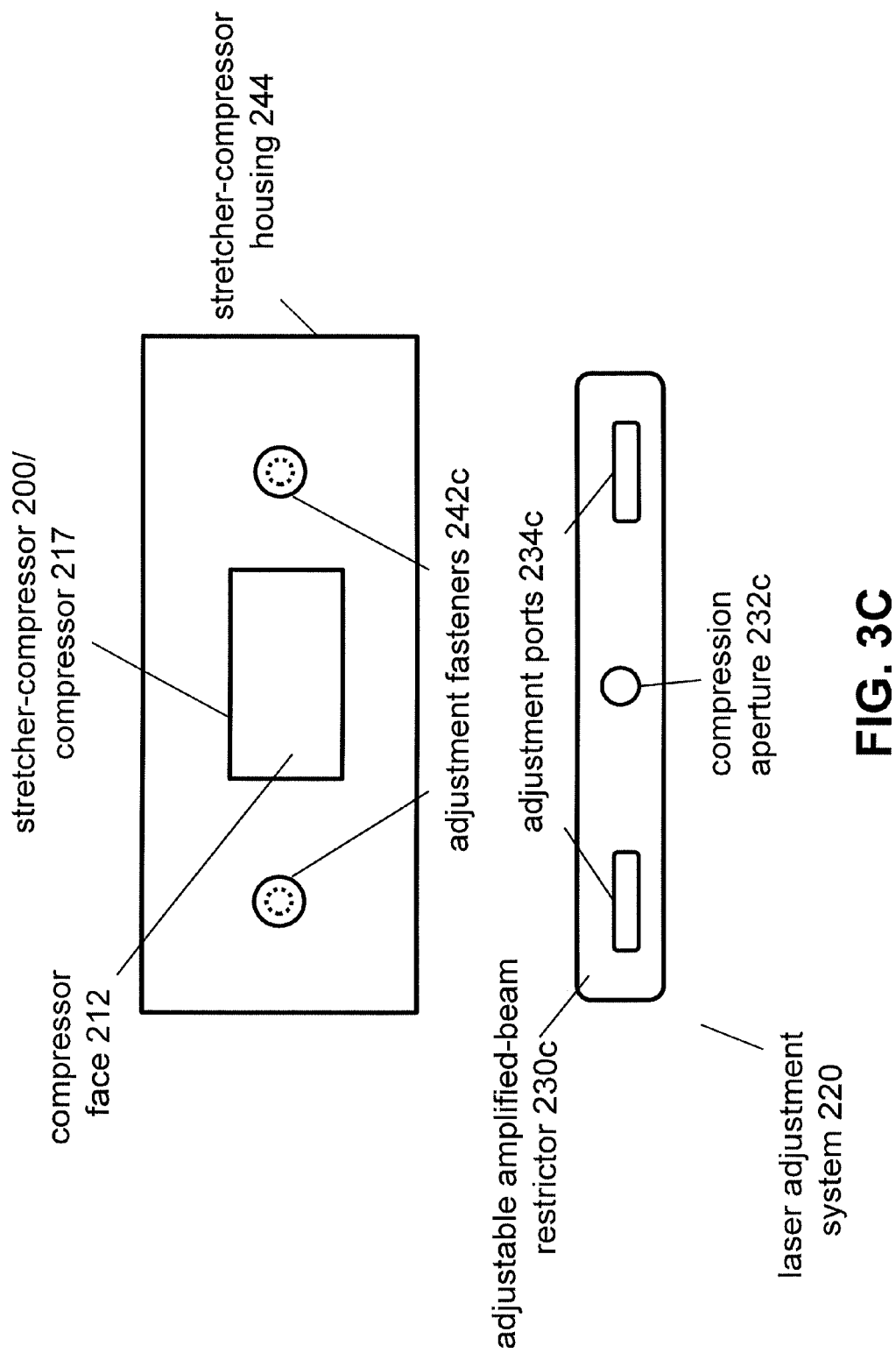

TRANSVERSE ADJUSTABLE LASER BEAM RESTRICTOR

TECHNICAL FIELD

This patent document relates to femtosecond lasers including high power femtosecond lasers with chirped pulse amplification. More precisely, this patent document relates to improving laser beam properties by employing adjustable elements in chirped pulse amplified lasers.

BACKGROUND

In many of today's ever more challenging laser applications there is a continued quest for shorter pulses which carry high energies per pulse. These features promise better control and greater operating speed for laser applications. A notable step in the evolution of the field was the appearance and maturation of laser systems outputting ultra-short, femtosecond laser pulses. These femtosecond lasers can be used for a wide variety of applications, including several different types of ophthalmic surgeries, where the ultra-short pulses can be used to modify the targeted ocular tissue in a well-controlled manner.

In early femtosecond lasers the extreme shortness of the pulse length lead to an extreme high power in these pulses. This high power, however, threatened to damage the gain medium of the lasers. The solution arrived in the form of the chirped pulse amplification (CPA) technique. In the CPA technique femtosecond seed pulses are generated by an oscillator or seed laser. The seed pulses are directed to a stretcher that stretches the length of the seed pulses by a factor of 10-1,000 to the picosecond range, thus drastically reducing the power within a pulse. These stretched pulses can be safely amplified with the gain medium of the amplifier without damaging the gain medium itself. The amplified pulses then are sent to a compressor that compresses the length of the amplified pulses back to femtoseconds. Lasers based on the CPA approach have been introduced into a large number of applications successfully up to date.

The performance of CPA systems is very sensitive to the stretcher performing the stretching without undermining the beam quality and the compressor being precisely tuned to the stretcher to be able to compress the pulses with high efficiency. Without these performance factors being just right, the compression of the laser pulses becomes incomplete and the length of the pulses does not get compressed back to the desired femtosecond range. Therefore, the fine tuning of the stretching and compression in chirped pulse amplification lasers remains a challenge.

SUMMARY

The need to fine tune the stretcher and the compressor generates problems and challenges both during the assembly and during the maintenance of CPA lasers to maintain their beam quality and the efficiency of the compression.

During the assembly of CPA lasers the time-consuming fine-tuning needs to be performed by highly trained personnel with sophisticated and specialized equipment. In a research or laboratory environment, CPA lasers can be fine-tuned during their assembly and also during their regular operations by the highly qualified personnel of the laboratory with the sophisticated equipments already at their disposal.

However, in the context of a manufacturing process, the need for highly trained personnel and sophisticated equipment all represent additional costs, added time in the assembly process, quality control challenges and potential points of failure.

Moreover, during the regular operations of commercially sold CPA lasers which are typically not installed in high-technology environments, the fine-tuning typically deteriorates for a variety of reasons. Thus, CPA lasers require regular tune-ups to restore the fine tuning of the stretcher and the compressor. The frequency of on-site maintenance required to keep the fine-tuning up-to-date is a burden and cost for the manufacturer and for the operator of the commercially sold CPA lasers.

Therefore, both for reasons of manufacturing and maintenance, developing CPA lasers that have reduced need and frequency of fine-tuning the stretcher and the compressor is highly desirable.

The implementations described in this patent document offer improvements for the fine tuning of the stretcher and compressor in chirped pulse amplification lasers by including adjustable elements to restrict and control the laser beam.

In particular, embodiments of a laser adjustment system can include an adjustable seed-beam restrictor, configured to be attachable to a stretcher-compressor in a transverse-adjustable manner and to restrict an incidence of a seed beam, generated by an oscillator, on the stretcher-compressor; wherein the stretcher-compressor is configured to be integrated into a chirped pulse amplification laser engine, and to stretch a duration of seed pulses of the seed beam.

In other embodiments, a laser adjustment system can include an adjustable seed-beam restrictor, configured to be attachable to a stretcher in a transverse-adjustable manner, and to restrict an incidence of a seed beam, generated by an oscillator, on the stretcher; wherein the stretcher is configured to be integrated into a chirped pulse amplification laser engine, and to stretch a duration of seed pulses of the seed beam.

Finally, embodiments of a method of improving a laser performance can include attaching a seed-beam restrictor transverse-adjustably to a stretcher face of a stretcher-compressor of a chirped pulse amplification laser; directing a seed beam of seed pulses, generated by an oscillator of the chirped pulse amplification laser, onto the stretcher face; monitoring a beam quality of a stretched beam, returned by the stretcher-compressor, as a transverse coordinate of the seed-beam restrictor is varied; determining a transverse quality-coordinate of the seed-beam restrictor where the monitored beam quality of the stretched beam satisfies a predetermined quality-criterion; and affixing the seed-beam restrictor to the stretcher face at the determined transverse quality-coordinate.

BRIEF DESCRIPTION OF DRAWINGS

FIGS. 3A-C illustrate a stretcher face and a compressor face of a stretcher-compressor and an adjustable beam restrictor separately and attached.

DETAILED DESCRIPTION

This patent document describes embodiments that optimize the fine-tuning of the stretcher and the compressor of chirped pulse amplification lasers by including one or more adjustable elements to restrict and control the laser beam.

Figure 1A:
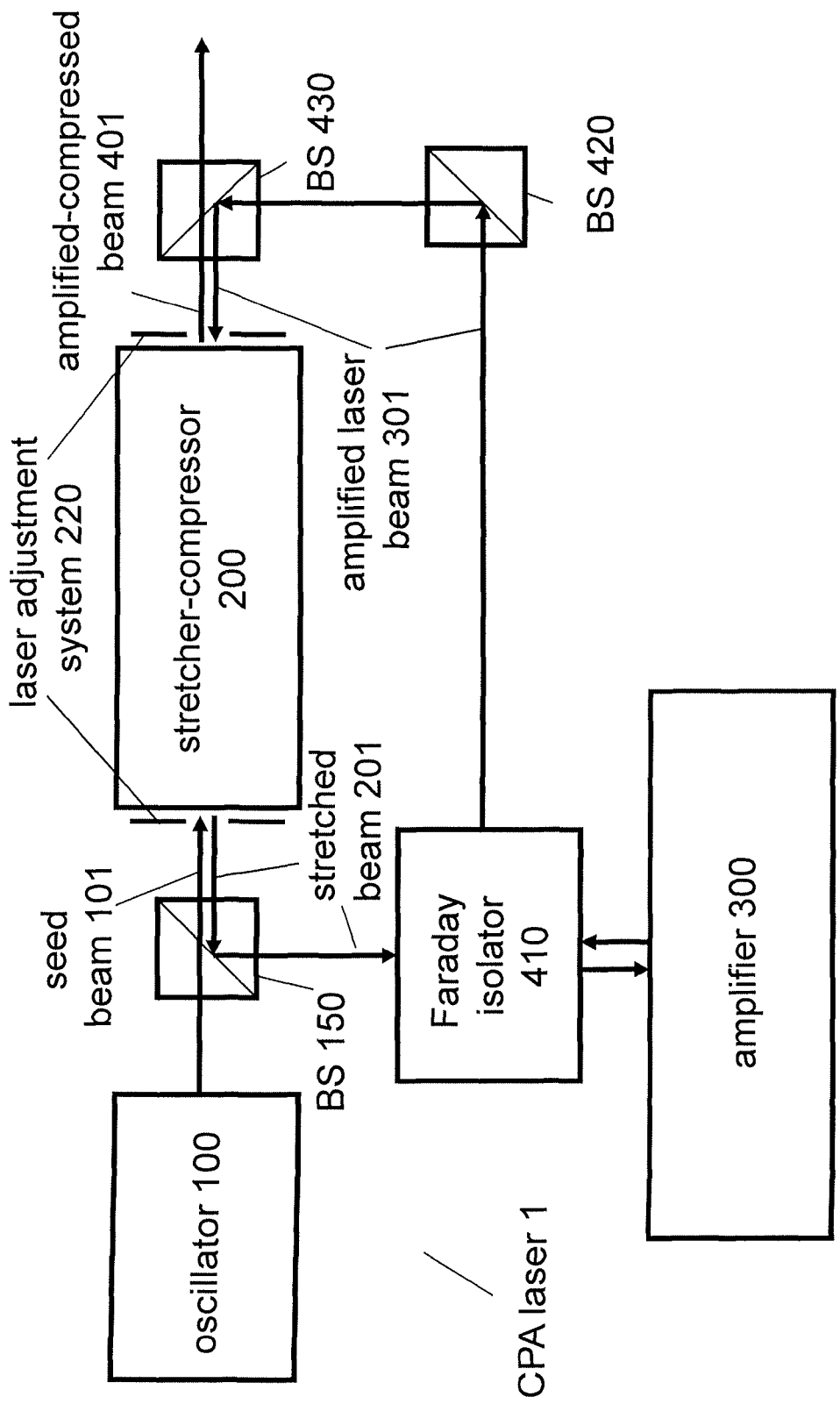
FIGS. 1A-B illustrate two embodiments of a high power femtosecond chirped pulse amplification laser engine 1.

FIG. 1A illustrates a chirped pulse amplification (CPA) laser engine 1.

The CPA laser engine 1 can be a cavity dumped regenerative amplifier (CDRA) laser, for instance. The main elements of the CPA laser 1 can include an oscillator 100, a stretcher-compressor 200, and an optical amplifier 300.

The oscillator 100 can generate and output a seed beam 101 of femtosecond seed pulses 101p. The oscillator 100 can be a wide variety of light sources which can generate and output seed pulses for the CPA laser engine 1. Examples include diode pumped fiber oscillators or free space seed lasers. The oscillator 100 may include a single GaAs diode operating at a wavelength of 808 nm, or a large variety of other diodes, operating at other wavelengths. Fiber oscillators are much smaller than free space oscillators, albeit have other limitations regarding their maximum power and pulse shape distortion. In surgical applications, where the crowdedness of the operating theatre is a pressing constraint, reducing the spatial extent of the laser engine by employing fiber oscillators can be an advantageous design feature.

In some examples, the oscillator diode can include a frequency stabilizing bar, such as a volume Bragg grating inside the diode. Further, the oscillator 100 can include a semiconductor saturable absorber mirror, or SESAM. Utilizing one or more SESAMs improves the coherence of the modes within the generated pulses, resulting in an essentially mode-locked operation.

Embodiments of the oscillator 100 can output essentially transform-limited seed pulses, e.g. with a Gaussian shape. In some examples, flat-top pulses may be also generated. The pulse-length can be in the range of 1-1,000 femtoseconds (fs), in other embodiments in the range of 100 fs-10 ps. The seed pulse frequency or repetition rate can be in the range of 10-100 MHz. The power of the beam of seed pulses can be in the range of 10-1000 mW.

The stretcher-compressor 200 can be integrated into the CPA laser engine 1 to stretch and later to compress the laser pulses. The oscillator 100 can couple the seed beam 101 into the stretcher-compressor 200 through a beam splitter BS 150. The incidence of the seed-beam 101 on the stretcher-compressor 200 can be restricted and controlled by a laser adjustment system 220, attachable to the stretcher-compressor 200 in a transverse-adjustable manner.

The stretcher-compressor 200 can stretch the seed pulses by introducing different delay times for the different frequency-components of the seed pulses. In short, the stretcher-compressor 200 can introduce dispersion or chirp into the pulses. Its operation will be described in more detail in relation to FIGS. 2A-B below. The stretcher-compressor 200 can output a stretched beam 201 of stretched pulses 201p and couple them into the amplifier 300 through the beam splitter BS 150 and a Faraday isolator 410.

The amplifier 300 can receive the stretched pulses 201p from the stretcher-compressor 200, amplify an amplitude of selected stretched pulses, and output a amplified laser beam 301 of amplified stretched pulses 301p. These amplified stretched pulses 301p can be optically coupled back into the stretcher-compressor 200 in a reverse direction through the Faraday isolator 410 and beam splitters BS 420 and BS 430. When used in this reverse direction, the stretcher-compressor 200 can (re-) compress a duration of the amplified stretched pulses 301p and output an amplified-compressed beam 401 of amplified-compressed pulses 401p of a femtosecond length.

The Faraday isolator 410 can ensure that the oscillator 100 is protected from the powerful amplified beam 301 created by the amplifier 300. In the absence of the Faraday isolator 410, a fraction of the amplified beam 301 could reach the oscillator 100 and damage it substantially because of the high energy content of the amplified stretched pulses 301p of the amplified stretched beam 301.

While some embodiments of the CPA laser engine 1 can be used in ophthalmic applications successfully, including cataract surgery, capsulotomy and corneal procedures, implementations of the CPA laser engine 1 can be used in a remarkably wide range of other applications as well, which include other types of ophthalmic procedures, such as retinal and corneal surgery, as well as dermatological, dental, cosmetic and internal surgical applications, and various material machining applications, which shape a piece of material with laser photodisruption or some other laser aided process.

Figure 1B:
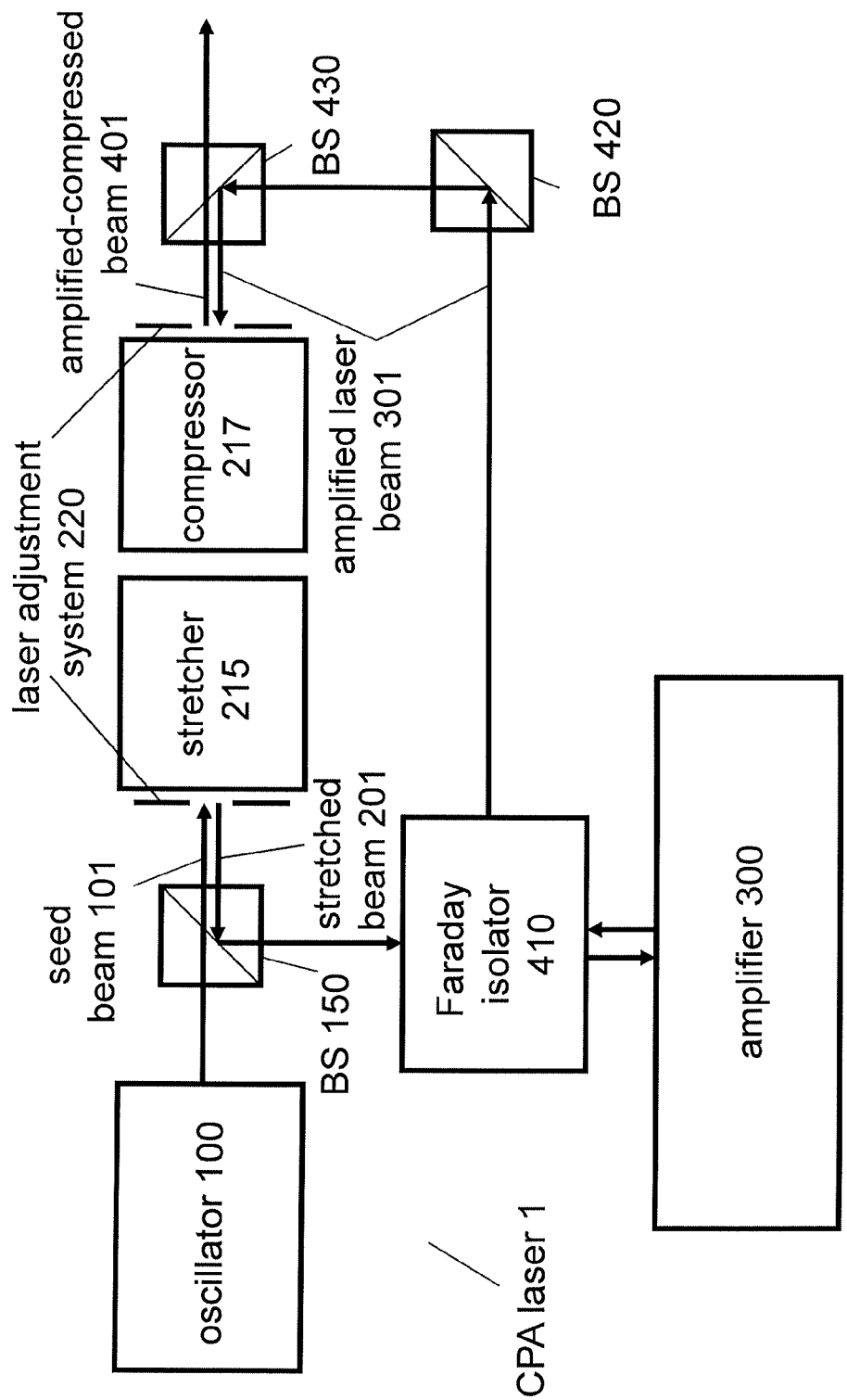

FIG. 1B illustrates a related implementation of the CPA laser 1, where the functions of the stretcher-compressor 200 are performed by two separate blocks: a stretcher 215 and a compressor 217. In some implementations, the stretcher 215 and the compressor 217 can be cut from the same single crystal.

Figure 2A:
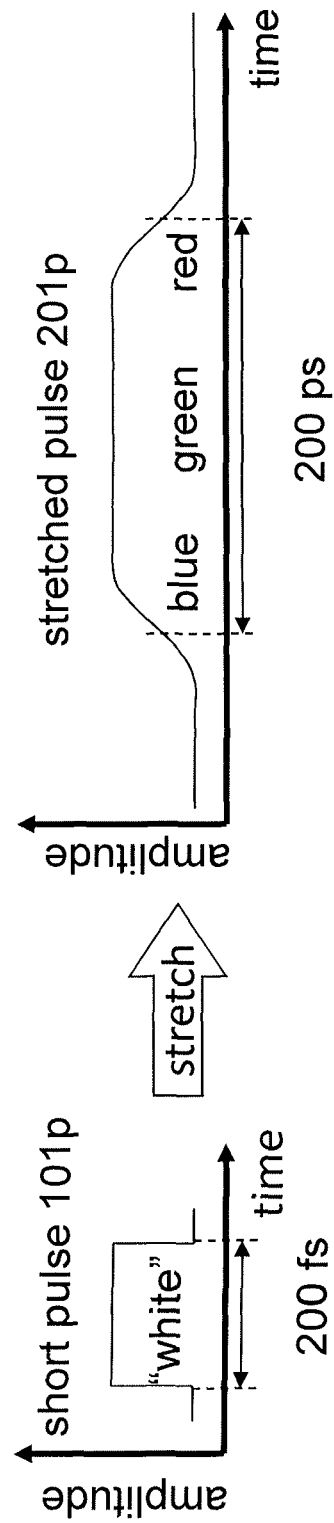
FIG. 2A illustrates the concept of the stretching-compressing method in a CPA laser.

FIG. 2A illustrates the concept of generating chirp in some detail. The stretcher-compressor 200 or the stretcher 215 may receive a short seed pulse 101p of the seed beam 101 whose frequency content, or spectrum, can be approximately uniform, or "white", across most of the duration of the pulse. In other words, the amplitude of the different frequency/wavelength spectral components at the beginning of the short pulse 101p is approximately even and remains so during the duration of the pulse.

The stretcher-compressor 200 or the stretcher 215 can stretch the pulse length of the short pulses 101p by introducing different delay times for the different spectral components of the short pulses 101p.

FIG. 2A illustrates that the different delay times for the different spectral components stretch the short seed pulses 101p into longer stretched pulses 201p. FIG. 2A further shows that the stretching also makes the frequency content or spectrum of the stretched pulses 201p time dependent. According to a typical convention, pulses where the leading part is dominated by the red frequencies while the trailing portion is dominated by blue frequencies are referred to as having a positive dispersion or chirp, as in the example shown in FIG. 2A.

The present description refers to chirp in the time domain: the high and low frequency components of the pulse are separated temporally. Other types of chirp, such as spatial chirp, where the high and low frequency components are separated spatially within the beam raises a variety of additional design challenges and is not among the desired functionalities of the stretcher-compressor 200 or the stretcher 215.

The stretcher-compressor 200 or the stretcher 215 may stretch a duration of the femtosecond seed pulses 101p from a range of 1-1,000 femtoseconds to a stretched duration of 1-1,000 picoseconds of the stretched pulses 201p. The stretcher-compressor 200 can stretch the duration of the femtosecond seed pulses 101p by a stretching factor greater than 10, 100, or 1000. Each of these stretching factors introduces different design criteria for the amplifier 300.

Early designs of stretchers and compressors involved several, individually adjustable gratings, prisms, or other spectral resolvers. The location and orientation of these spectral resolvers had to be fine tuned and aligned to achieve the desired stretching effect. These alignments were sensitive and thus required precise calibration during manufacture and regularly repeated maintenance or re-calibration during operations. For applications in non-high-tech settings, such as in medical environments, the need for high maintenance of these early types of CPA lasers was an obstacle against more widespread market acceptance.

Figure 2B:
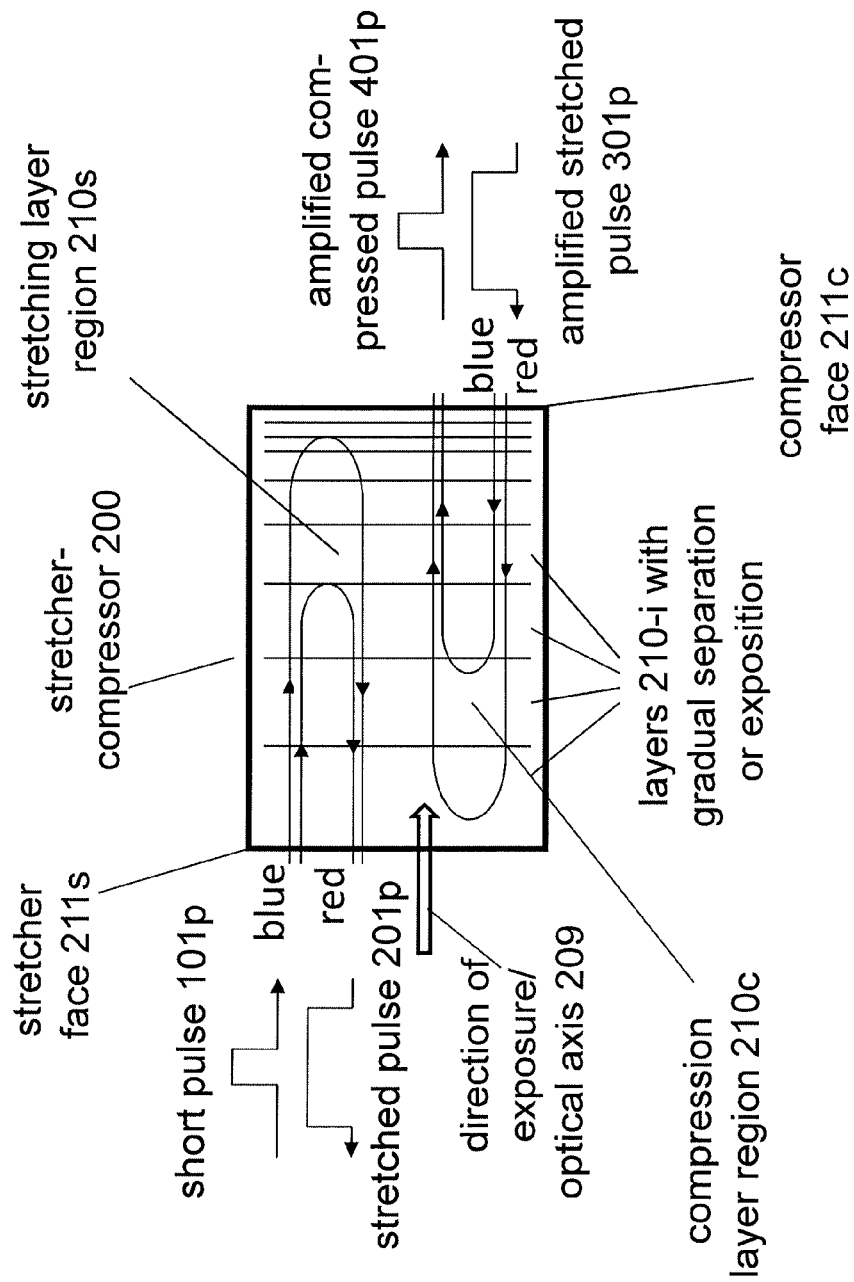
FIG. 2B illustrates a stretcher-compressor.

FIG. 2B illustrates an example of the stretcher-compressor 200 that offers improvements regarding these challenges. First, the stretcher-compressor 200 of FIG. 28 can eliminate the need for individually adjustable spectral resolvers for the stretching by including a Chirped Volume Bragg Grating (CVBG). This CVBG can include a stack of layers 210-$i$, formed e.g. in a photothermal refractive (PTR) glass perpendicular to a direction of exposure or optical axis 209. The layers 210-$i$ can have a suitable index of refraction and a grating period or separation that varies gradually with the position of the layers 210-$i$ along the optical axis 209. In such a design, the condition for Bragg reflection occurs at different depths for the different spectral components of the short seed pulse 101$p$.

Since different spectral components of the seed pulse 101$p$ are reflected at different depths of the CVBG, they traverse optical pathways of different lengths and thus acquire different time delays. As shown in the example in FIG. 2B, when the short "white" seed pulse 101$p$ enters the stretcher-compressor 200 through a stretcher face 211$s$, its red frequency components get reflected from the near regions of a stretching layer region 210$s$ that have wider layer spacing, or grating periods, since their wavelength is longer and satisfies the Bragg reflection conditions in these near regions.

In contrast, the blue frequency components, having shorter wavelengths, are reflected from the farther regions of the stretching layer region 210$s$ in the CVBG. Since the blue components traverse a longer optical path, they get delayed relative to the red components of the seed pulse 101$p$. Thus, the inputted short white seed pulse 101$p$ is stretched by the CVBG stretcher-compressor 200 or stretcher 215 into a longer stretched pulse 201$p$. In the specific example, the stretched pulse 201$p$ develops a positive chirp because the blue components are delayed relative to the red components within the pulse. Other implementations of the stretcher-compressor 200 can have a CVBG producing a negative chirp, delaying the red spectral components relative to the blue ones. Visibly, in this embodiment the stretching function of the stretcher-compressor 200 or the self-standing stretcher 215 can be performed without aligning individually adjustable spectral decomposers.

The second advantage of the CVBG design of the stretcher-compressor 200 in FIG. 2B is that the stretched pulses 201$p$ can be compressed back to femtosecond pulses by returning them as amplified stretched pulses 301$p$ to the same stretcher-compressor 200 but through an oppositely positioned compressor face 211$c$. This design allows the amplified stretched pulses 301$p$ to traverse through a compression layer region 210$c$ of the same layer structure 210-$i$ that stretched the pulses in the stretching phase, only from the opposite direction. Since the same layer structure is traversed in reverse, this design can undo the original stretching with a high precision, again without requiring additional individually adjustable spectral resolvers that require fine-tuning.

In some detail, when a stretched amplified pulse 301$p$ enters the CVBG stretcher-compressor 200 through the compressor face 211$c$, its red components are delayed to the same degree by the layers 210-$i$ of the compression layer region 210$c$ as its blue components were delayed during the stretching by the stretching layer region 210$s$, thus restoring the original short length of the seed pulse 101$p$. Therefore, the stretcher-compressor 200 with the CVBG architecture can compensate the stretching introduced by the stretcher very efficiently and output amplified compressed pulses 401$p$ with a length compressed back to femtoseconds.

In other embodiments, like the embodiment of FIG. 1B, the stretching performed by the stretcher 215 can be undone with high precision by the separate compressor 217 if their layer structure 210-$i$ is each other's reverse with a high precision. One way to achieve this is to cut the stretcher 215 and the compressor 217 from the same single crystal after the layers 210-$i$ have been formed with gradually varying separation or index of refraction, perpendicular to the direction of exposure 209.

It is clear from the above description that the stretching of the seed pulses 101$p$ and the (re-) compression of the amplified stretched pulses 301$p$ is the most efficient if in the layer structure 210-$i$ the layer-to-layer distance, the layer thickness and smoothness and the layer index of refraction, cumulatively the layer characteristics, are independent from the (x,y) coordinates transverse to z, the direction of exposure or optical axis 209.

In real systems, unfortunately, the layer characteristics typically depend from the transverse coordinates (x,y) to some degree. For example, when the layer structure 210-$i$ is formed by exposure to lithographic beams incident along the direction of exposure 209, it is often the case that the layer characteristics end up exhibiting some degree of transverse variations because of the aberrations of the lithographic beam or material variations within the used base crystal.

This (x,y) dependence can present design problems for at least two reasons. (1) First, if the layer characteristics depend on the transverse coordinates (x,y) within the beam diameter, then the spectral components of the stretched pulses 201$p$ can acquire different delays depending on the (x,y) coordinates. This spatial inhomogeneity leads to the stretched pulses 201$p$ developing a spatial chirp besides the temporal chirp, which is much harder to compensate back to a femtosecond pulse length.

(2) Second, the compression is the most efficient if the amplified stretched pulses 301$p$ propagate through a compressor layer region 210$c$ whose layer structure is as close as possible to the stretch layer region 210$s$, only in reverse, to precisely undo the stretching. However, if the layers 210-$i$ are formed with (x,y) dependent layer characteristics, then the layer characteristics in the compression layer region 210$c$ can be quite different from those in the stretching layer region 210$s$, making the compression incomplete or inefficient.

Therefore, it is a design challenge to reduce or minimize the unwanted spatial chirp and incomplete compression of the laser pulses by the stretcher-compressor 200, driven by the transverse variations of the layer characteristics.

Figure 3A:
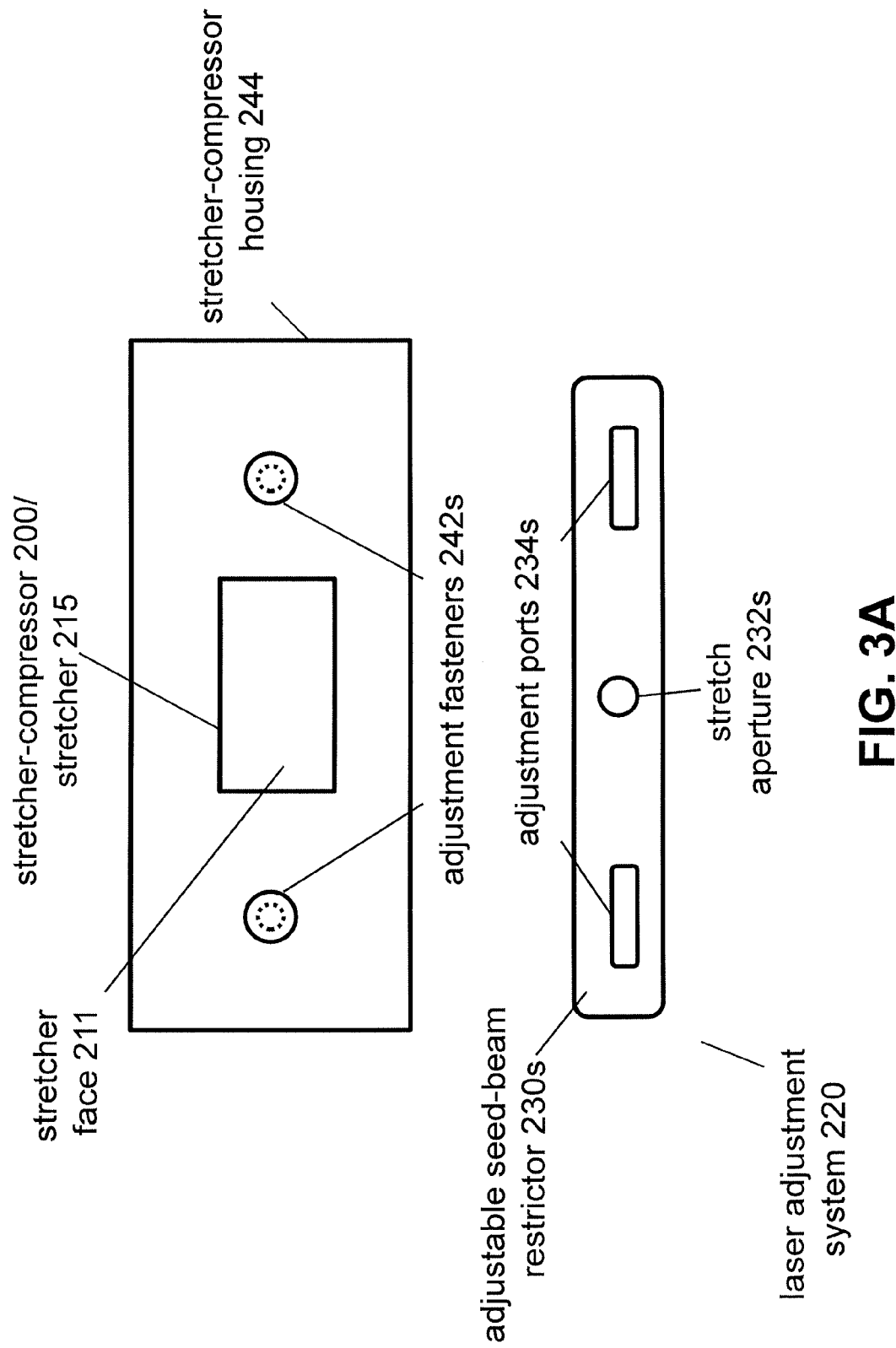

In this regard, FIG. 3A illustrates an embodiment of the laser adjustment system 220 that can rise to both above described design challenges by restricting the incidence of the seed beam 101 falling on the stretcher face 211$s$, and the amplified-stretched beam 301 falling on the compressor face 211$c$ to spots where (1) the layer characteristics show minimal variations within the beam diameter, and (2) the structure of the layers in the compression layer region 210$c$ is a close match to the structure of the layers in the stretching layer region 210$s$, only in reverse. Since spots selected based on these two requirements do not always line up perfectly with each other, some embodiments of the laser adjustment system 220 may be configured to strike a good compromise between these requirements.

The improvements can be brought about in some embodiments by the laser adjustment system 220 having an adjustable seed-beam restrictor 230s. The adjustable seed-beam restrictor 230s can be attachable to the stretcher face 211s of the stretcher-compressor 200 in a transverse-adjustable manner, and can be configured to restrict an incidence of the seed beam 101, generated by the oscillator 100, on the stretcher-face 211s of the stretcher-compressor 200, as described below in more detail.

Here, the stretcher-compressor 200 can be integrated into the above described chirped pulse amplification (CPA) laser engine 1. In particular, the stretcher-compressor 200 or the stretcher 215 can stretch the duration of the seed pulses 101p of the seed beam 101 generated by the oscillator 100. In some embodiments, the stretcher-compressor 200 or the stretcher 215 can also include a Chirped Volume Bragg Grating, or CVBG.

The adjustable seed-beam restrictor 230s can include a stretch aperture 232s of radius r to constrict or restrict an incidence spot of the seed beam 101 on the stretcher face 211s of the stretcher-compressor 200 or stretcher 215. This embodiment can address, among others, the first of the above-described design challenges, the transverse variations of the layer characteristics within the beam radius, leading to the generation of a spatial chirp and to the degradation of the temporal chirp of the returned stretched beam 201.

The use of the adjustable seed-beam restrictor 230s can improve the quality of the stretched beam 201 through the following steps: (1) adjustably attaching the transverse-adjustable seed-beam restrictor 230s to the stretcher face 211s so that the stretch aperture 232s restricts the spot of incidence of the seed beam 101 to a vicinity of radius r of a transverse coordinate or location (x,y); (2) varying the transverse coordinate (x,y) of the incidence spot and stretch aperture 232s; (3) monitoring a dependence of the spatial chirp, temporal chirp, or beam quality of the reflected stretched beam 201 on the transverse coordinates (x,y) by a suitable device, such as a spectral analyzer or a wavefront analyzer; (4) determining the transverse location $(x,y)_{opt}$ that optimizes the monitored beam quality or chirp, or makes the monitored quality or chirp satisfy a predetermined criterion; and finally (5) affixing the adjustable seed-beam restrictor 230s to the stretcher face 211s approximately at the optimal location $(x,y)_{opt}$. The optimal transverse location $(x,y)_{opt}$ typically corresponds to the stretching layer region 210s with the smoothest layers that best follow the designed layer separations and index of refraction.

In step (4), not only the spatial chirp can be tracked but any selected indicator of the beam quality. In some embodiments, the efficiency of (re-) compression of the amplified stretched pulses 301p to femtosecond amplified compressed pulses 401p by the compressor 217 can be optimized. In yet other embodiments, a selected measure of the aberration of the stretched beam 201 can be optimized. In some embodiments, a combination of more than one beam quality can be collectively optimized.

The adjustable seed-beam restrictor 230s can be embodied not only by using the stretch aperture 232s, but instead by using a partial beam blocker, a beam attenuator, a mask or a lens. In each of these cases, the adjustable seed-beam restrictor 230s can be transverse-adjustable so that it can restrict the incidence of the seed beam 101 on the stretcher face 211s.

In some embodiments, the adjustable seed-beam restrictor 230s can be adjustable in one transverse dimensions, either the x, y, or some generic direction, transverse to the optical axis 209 of the stretcher-compressor 200 or the stretcher 215.

The adjustable seed-beam restrictor 230s may be affixed to the stretcher face 211s of stretcher-compressor 200 or the stretcher 215 with the help of one or more adjustment ports 234s, configured to be adjustably attachable to the stretcher face 211s. FIG. 3A illustrates that the adjustment ports 234s can be linear slits, allowing the adjustment of the transverse-adjustable seed-beam restrictor 230s along one direction. The adjustment ports 234s can be engaged by adjustment fasteners 242s, configured to accommodate an adjustable attachment of the adjustable seed-beam restrictor 230s. The adjustment fasteners 242s can include a movable fastener, a screw, a bolt-and-nut combination, and a slider. The adjustment fasteners 242s can be formed, located or attached on a stretcher-compressor housing 244 that accommodates the stretcher-compressor 200 or the stretcher 215.

Figure 3B:
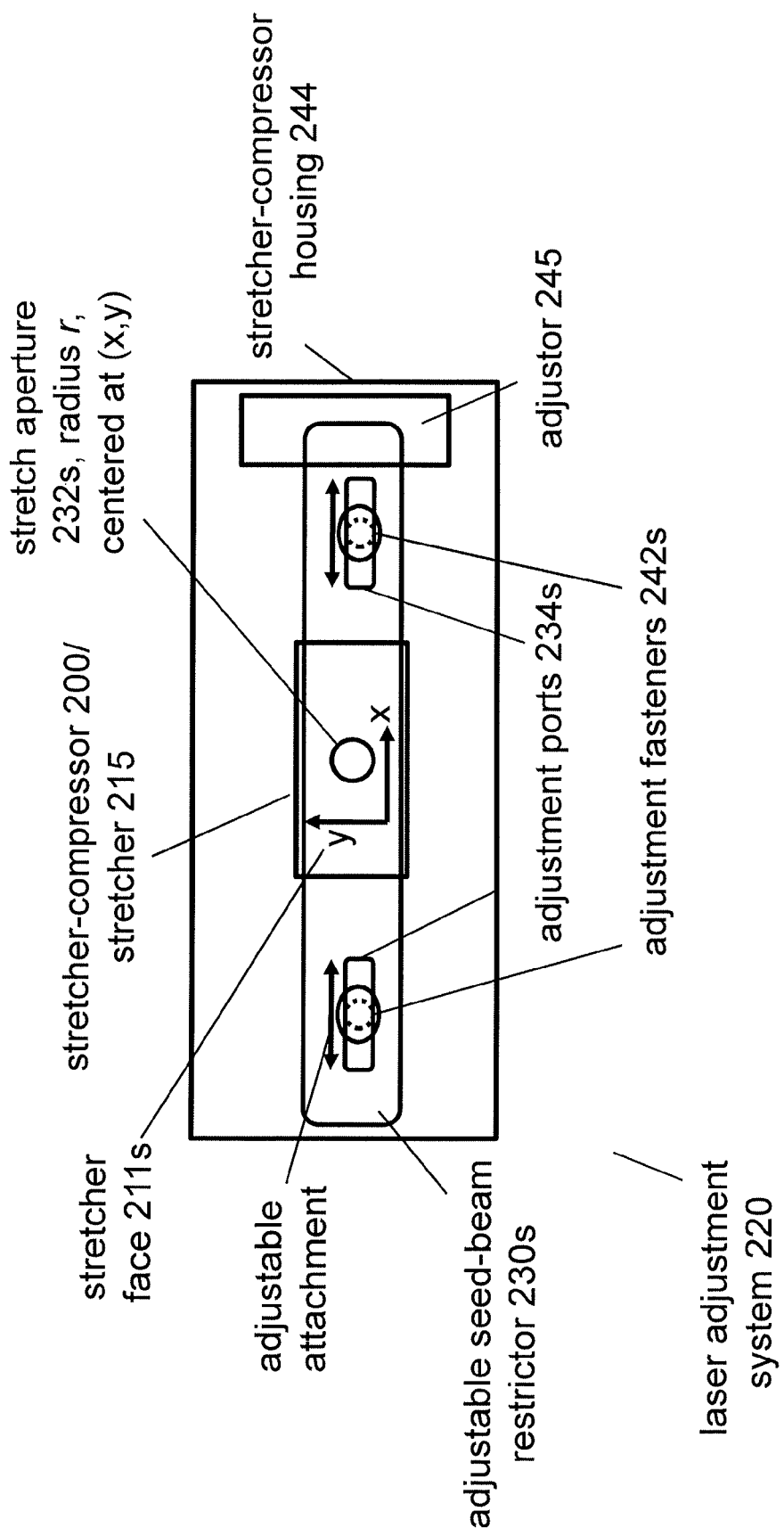

FIG. 3B illustrates the adjustable seed-beam restrictor 230s attached to the stretcher housing 244 via the adjustment fasteners 242s engaging the adjustment ports 234s. The adjustable seed-beam restrictor 230s can thus restrict the incidence spot of the seed beam 101 to a circle of radius r centered at the transverse location (x,y) of the center of the stretch aperture 232s.

Since the adjustment ports 234s can allow a motion in a transverse direction, the adjustable seed-beam restrictor 230s and thus the incidence spot of the seed beam 101 can be moved in a transverse direction relative to the optical axis 209. In some embodiments, the transverse location of the adjustable seed-beam restrictor 230s may be adjusted by an adjustor 245 that can include a slider, a lever, a micro-motor, an electro-mechanical adjuster, or a PZT-controlled adjuster. In other embodiments, the adjustable seed-beam restrictor 230s may be adjusted manually by a technician.

FIG. 3C illustrates that some embodiments of the laser adjustment system 220 can include an adjustable amplified-beam restrictor 230c that is attachable to the stretcher-compressor 200 or the compressor 217 at the compressor face 211c in a transverse-adjustable manner. The amplified-beam restrictor 230c can be configured to restrict an incidence of the amplified stretched beam 301 on the compressor face 211c of the stretcher-compressor 200 or the compressor 217.

As described above, the efficiency of the compression of the amplified stretched pulses 301p can be enhanced if the amplified stretched beam 301 is guided and restricted by a compression aperture 232c of the amplified-beam restrictor 230c to be Bragg-reflected from a compression layer region 210c whose structure is as close as possible to the layer structure of the stretching layer region 210s, selected by the seed-beam restrictor 230s, only in a reverse manner. To achieve that, the amplified-beam restrictor 230c can be transverse-adjusted analogously to the seed-beam restrictor 230s: by adjustably connecting its adjustment ports 234c to adjustment fasteners 242c that can be attached or located on the stretcher-compressor housing 244. With this design, the amplified-beam restrictor 230c can be moved around the compressor face 211c, a compression-monitoring sensor or detector can be used to monitor the compression of the compressed amplified pulses 401p, the location where the monitored compression is optimal or acceptable within the search space can be identified, and the amplified-beam restrictor 230c can be affixed to the compressor face 211c at the identified location.

Figure 4:
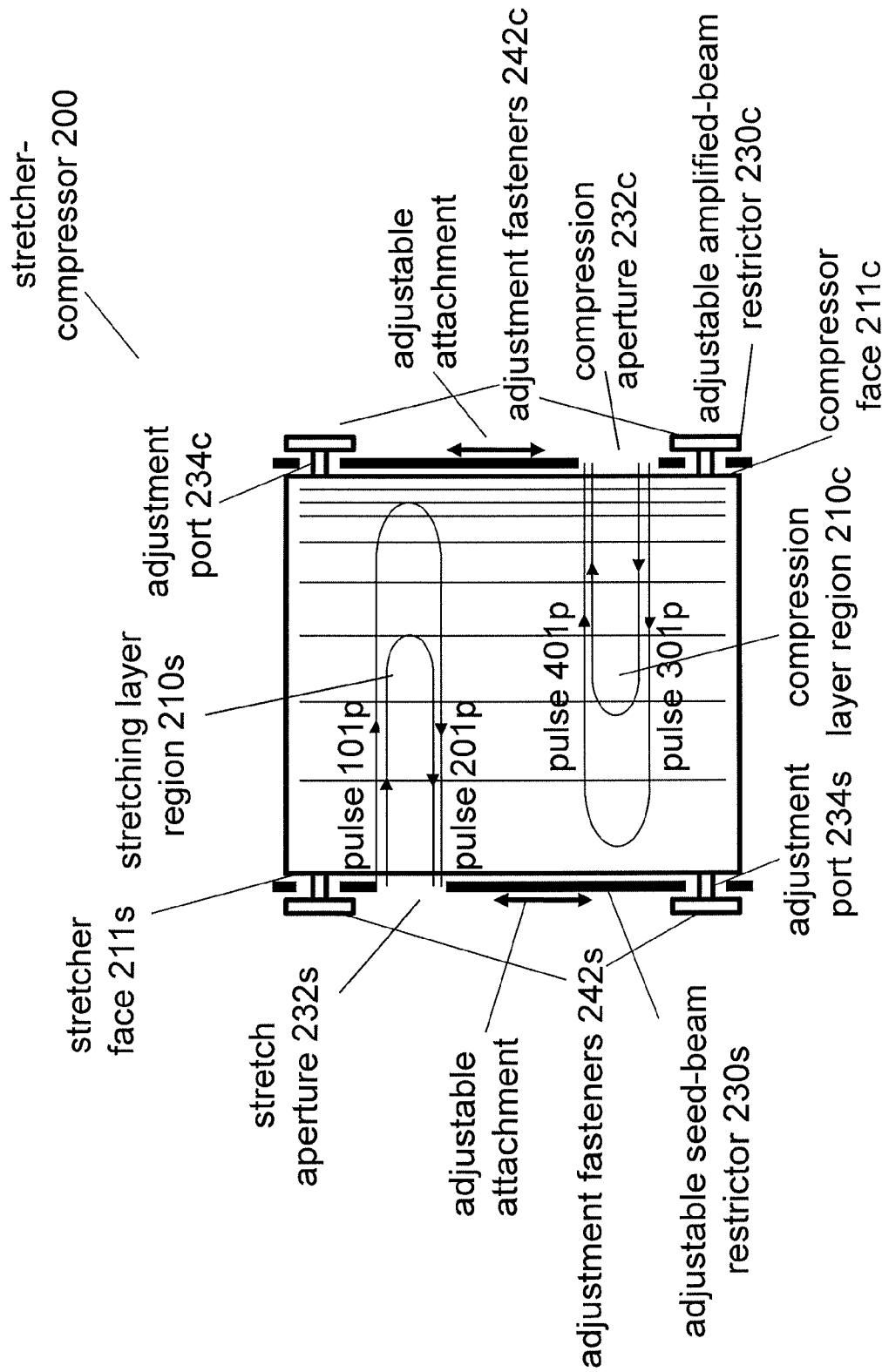
FIG. 4 illustrates a stretcher-compressor, an adjustable seed-beam restrictor and an adjustable amplified-beam restrictor in a side-view.

FIG. 4 illustrates a side view of an embodiment of the integrated stretcher-compressor 200. In this embodiment, the adjustable seed-beam restrictor 230s has two adjustment ports 234s that can be elongated holes or slits. The adjustment fasteners 242s can be screws with sufficiently large radius heads, so that when the screws 242s are tightened, they hold on to the adjustable seed-beam restrictor 230s and affix it to the stretcher face 211s of the housing 244 of the stretcher-compressor 200 so that the stretch aperture 232s is at the $(x,y)_{opt,s}$ position that was determined by monitoring the beam quality of the stretched beam 201, or in a position that satisfies a predetermined criterion.

Analogously, on the compressor face 211c, the adjustment fasteners, e.g., screws 242c, can allow a transverse adjustment of the adjustment ports 234c of the amplified-beam restrictor 230c, followed by the tightening of the screws 242c to affix the adjustable amplified-beam restrictor 230c to the compressor face 211c so that the compression aperture 242c is in the optimal position $(x,y)_{opt,c}$, or in a position that satisfies a predetermined criterion.

Figure 5A:
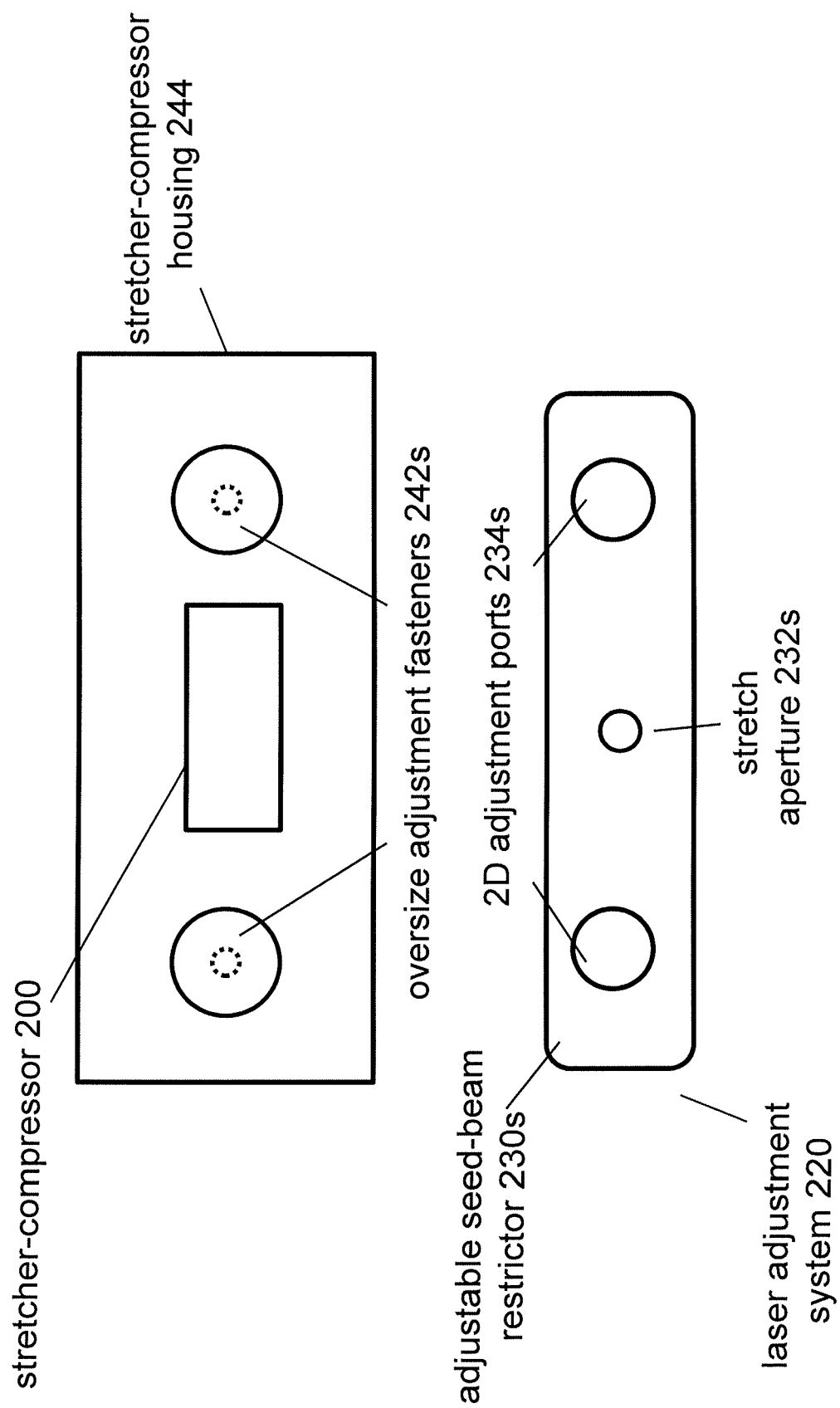
FIGS. 5A-B illustrate an adjustable beam restrictor, adjustable in two dimensions.
Figure 5B:
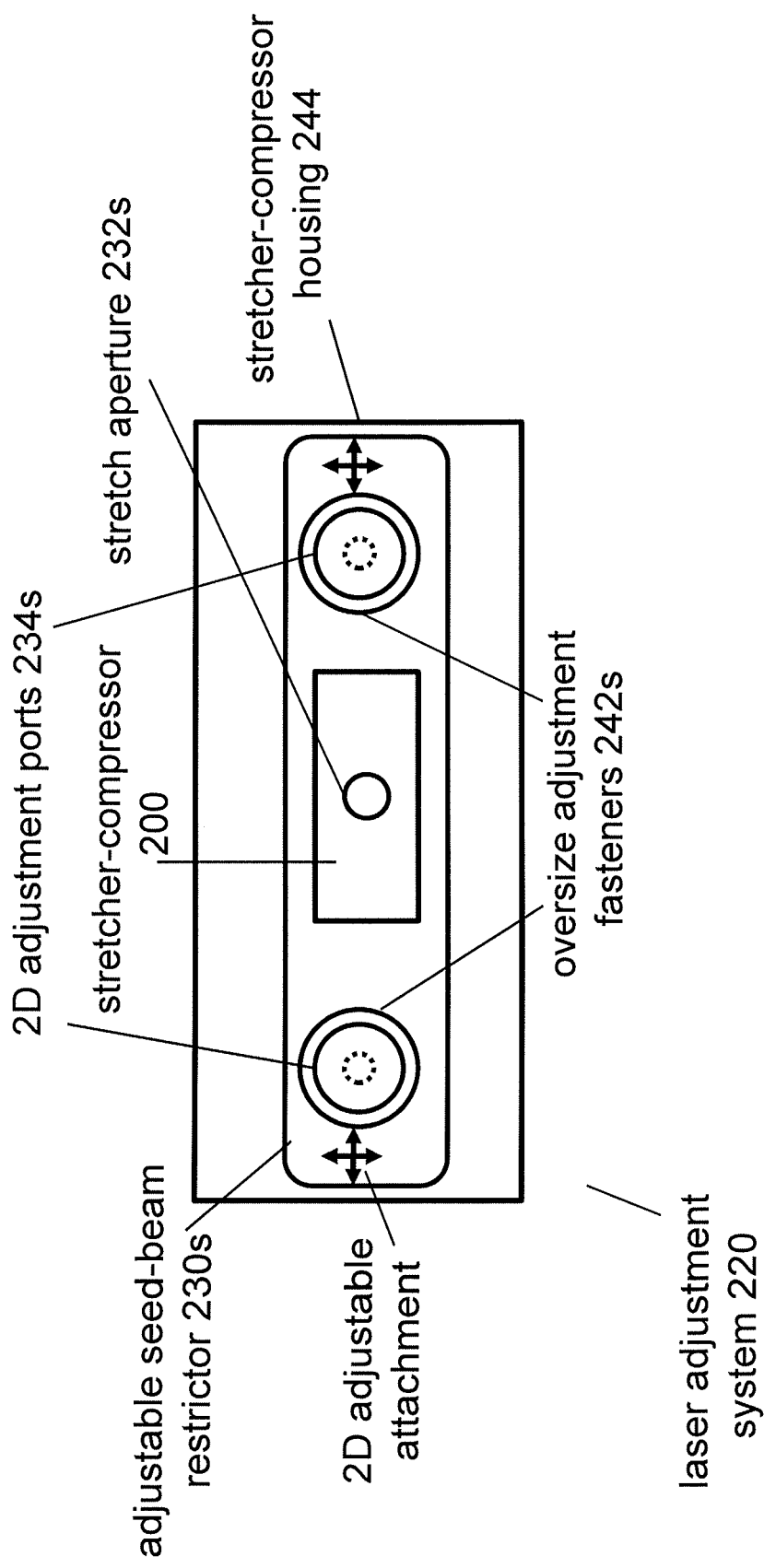

FIGS. 5A-B illustrate an embodiment of the laser adjustment system 220 that allows transverse adjustment in two directions. In this embodiment, the two dimensional (2D) adjustment ports 234s can be circular or otherwise extended, instead of the linear slits of FIGS. 3-4. When the 2D adjustment ports 234s are engaged with the oversize adjustment fasteners 242s, the adjustable seed-beam restrictor 230s can be moved both in the x and y directions. Once the transverse coordinates $(x,y)_{opt}$ of the center of the stretch aperture 232s corresponding to the optimal beam quality have been identified, the oversize adjustment fasteners 242s with oversize heads can be used to fasten or affix the adjustable seed-beam restrictor 230s in its optimal location to the stretcher-compressor housing 244.

For completeness it is repeated here that in all of the above embodiments, the stretcher-compressor 200 can be one integrated unit 200 as in FIGS. 1A, 2B, and 4, or it can include a separate stretcher 215 and separate compressor 217, as in FIG. 1B and one embodiment of FIGS. 3A-C. In another embodiment, FIGS. 3A-C can just illustrate two ends of an integrated embodiment 200.

Figure 6:
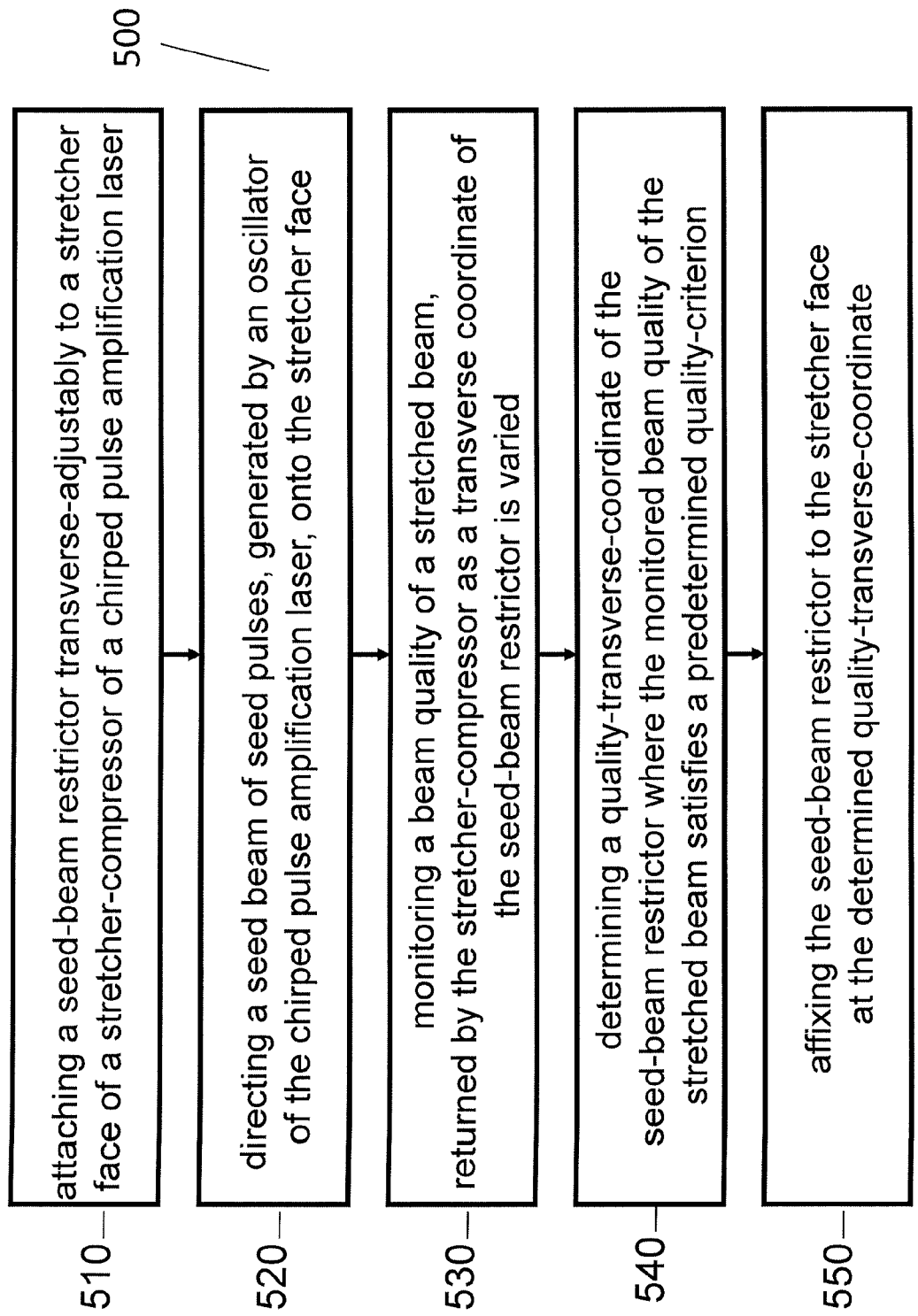
FIG. 6 illustrates a method to adjust the adjustable seed-beam restrictor.

FIG. 6 illustrates a method 500 of improving a performance of a CPA laser engine. The method 500 can include:

attaching 510 a seed-beam restrictor transverse-adjustably to a stretcher face of a stretcher-compressor of a chirped pulse amplification laser;

directing 520 a seed beam of seed pulses, generated by an oscillator of the chirped pulse amplification laser, onto the stretcher face;

monitoring 530 a beam quality of a stretched beam, returned by the stretcher-compressor, as a transverse coordinate of the seed-beam restrictor is varied;

determining 540 a quality-transverse-coordinate of the seed-beam restrictor where the monitored beam quality of the stretched beam satisfies a predetermined quality-criterion; and affixing 550 the seed-beam restrictor to the stretcher face at the determined quality-transverse-coordinate. The structural elements in the above method steps can be the analogously-named structural elements described in FIGS. 1-5.

In the context of the determining 540, the predetermined quality-criterion can take many different forms. In some embodiments, the quality-criterion can be whether a spatial chirp of the stretched beam reached a minimum value as the transverse coordinate of the seed-beam restrictor was varied across the stretcher face. In other embodiments, the quality-criterion can be whether a beam aberration value was reduced below a certain value by moving around the amplified-beam restrictor. In yet other embodiments, the quality-criterion can be whether a spectrum of the stretched pulses of the stretched beam reached a desired time dependence.

In some embodiments, the monitoring 530 can include measuring a spatial chirp of the stretched beam corresponding to the varied transverse coordinate of the seed-beam restrictor.

In some embodiments, the method 500 can further include attaching an amplified-beam restrictor transverse-adjustably to a compressor face of the stretcher-compressor of the chirped pulse amplification laser; directing an amplified beam of amplified stretched pulses, generated by an amplifier of the chirped pulse amplification laser, onto the compressor face; monitoring a compression characteristic of compressed pulses of a compressed beam, returned by the stretcher-compressor as a transverse coordinate of the amplified-beam restrictor is varied; determining a compression-transverse-coordinate of the amplified-beam restrictor where the monitored compression characteristic satisfies a predetermined compression-criterion; and affixing the amplified-beam restrictor to the compressor face at the determined compression-transverse-coordinate.

In some embodiments of the method 500, the determining 540 of a quality-transverse-coordinate of the seed-beam restrictor can involve using both the monitored beam quality and the monitored compression characteristic. This embodiment of the method 500 can be practiced, e.g., when the satisfying the quality-condition and satisfying the compression-criterion do not occur at the same transverse coordinate of the seed-beam restrictor. In this case, a compromise transverse coordinate can be computed for the seed-beam restrictor that can be computed using both the monitored beam quality and the monitored compression characteristic.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

What is claimed is:

1. A laser system, comprising:
an oscillator, configured to generate a seed beam;
a stretcher-compressor, configured
to receive the seed beam, and
to stretch a duration of seed pulses of the seed beam;
an adjustable seed-beam restrictor attached in a transverse-adjustable manner to a stretcher face of the stretcher-compressor,
and
configured to restrict an incidence of the seed beam, generated by the oscillator on the stretcher compressor, and
an amplifier, configured
to receive the stretched seed pulses form the stretcher-compressor,
to amplify an amplitude of selected stretched seed pulses to create amplified stretched pules, and
to output a laser beam of amplified stretched pulses, the stretcher-compressor, configured
to receive the laser beam of amplified stretched pulses,
to compress a duration of the amplified stretched pulses, and
to output a laser beam of compressed pulses,
an adjustable amplified-beam restrictor attached in a transverse-adjustable manner to a compressor face of the stretcher-compressor, and
configured to restrict an incidence of an amplified beam on the stretcher-compressor.

2. The laser system of claim 1, the stretcher-compressor comprising:
a chirped volume Bragg grating (CVBG).

3. The laser system of claim 1, the adjustable seed-beam restrictor comprising:
a stretch aperture, configured to restrict an incidence spot of the seed beam on the stretcher-compressor.

4. The laser system of claim 1, wherein:
the adjustable seed-beam restrictor comprises at least one of a partial beam blocker, a beam attenuator, a mask and a lens.

5. The laser system of claim 1, wherein:
the adjustable seed-beam restrictor is adjustable in a transverse dimension relative to an optical axis of the stretcher-compressor.

6. The laser system of claim 1, wherein:
the adjustable seed-beam restrictor is adjustable in two transverse dimensions relative to an optical axis of the stretcher-compressor.

7. The laser system of claim 1, the stretcher-compressor comprising:
one or more adjustment fastener, configured to accommodate an adjustable affixing of the adjustable seed-beam restrictor to the stretcher-compressor.

8. The laser system of claim 7, the stretcher-compressor comprising:
a housing; wherein
the housing comprises a stretcher face, and
the adjustment fastener is attached to the stretcher face.

9. The laser system of claim 7, the adjustable seed-beam restrictor comprising:
one or more adjustment ports, configured to be adjustably attachable to the adjustment fastener of the stretcher-compressor.

10. The laser system of claim 7, wherein:
the adjustment fastener comprises at least one of a movable fastener, a screw, a bolt-and-nut combination, and a slider.

11. The laser system of claim 7, wherein:
the adjustable seed-beam restrictor can be adjusted by an adjustor, comprising at least one of a slider, a lever, a micro-motor, an electro-mechanical adjuster, and a PZT-controlled adjuster.

12. A method of improving a laser performance, the method comprising:
attaching a seed-beam restrictor transverse-adjustably to a stretcher face of a stretcher-compressor of a chirped pulse amplification laser;
directing a seed beam of seed pulses, generated by an oscillator of the chirped pulse amplification laser, onto the stretcher face;
monitoring a beam quality of a stretched beam, returned by the stretcher-compressor, as a transverse coordinate of the seed-beam restrictor is varied;
determining a quality-transverse-coordinate of the seed-beam restrictor where the monitored beam quality of the stretched beam satisfies a predetermined quality-criterion;
affixing the seed-beam restrictor to the stretcher face at the determined transverse quality-transverse-coordinate;
attaching an amplified-beam restrictor transverse-adjustably to a compressor face of the stretcher-compressor of the chirped pulse amplification laser;
directing an amplified beam of amplified stretched pulses, generated by an amplifier of the chirped pulse amplification laser, onto the compressor face;
monitoring a compression characteristic of compressed pulses of a compressed beam, returned by the stretcher-compressor as a transverse coordinate of the amplified-beam restrictor is varied;
determining a compression-transverse-coordinate of the amplified-beam restrictor where the monitored compression characteristic satisfies a predetermined compression-criterion; and
affixing the amplified-beam restrictor to the compressor face at the determined compression-transverse-coordinate.

13. The method of claim 12, the determining a quality-transverse-coordinate of the seed-beam restrictor comprising:
using both the monitored beam quality and the monitored compression characteristic.

* * * * *